United States Patent
Corke et al.

(10) Patent No.: US 6,414,938 B1
(45) Date of Patent: Jul. 2, 2002

(54) METHOD AND SYSTEM FOR RETRANSMITTING DATA PACKETS IN A COMMUNICATION SYSTEM HAVING VARIABLE DATA RATES

(75) Inventors: Robert John Corke, La Grange; Robert T. Love, Barrington; Ron Rotstein, Arlington Heights, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/504,649

(22) Filed: Feb. 14, 2000

(51) Int. Cl.[7] .................................................. H04J 3/14
(52) U.S. Cl. ....................... 370/231; 370/253; 370/465; 370/468
(58) Field of Search ................................ 370/229, 230, 370/231, 232, 235, 252, 253, 389, 395, 401, 465, 470, 471, 474, 468, 545; 709/230, 231, 232, 233, 234, 238; 714/1, 2, 3, 4, 748, 749

(56) References Cited

U.S. PATENT DOCUMENTS

| | | | | |
|---|---|---|---|---|
| 4,691,314 A | * | 9/1987 | Bergins et al. | 370/94 |
| 5,191,583 A | * | 3/1993 | Pearson et al. | 370/94.1 |
| 5,594,729 A | * | 1/1997 | Kanakia et al. | 370/391 |
| 5,627,970 A | * | 5/1997 | Keshav | 395/200.13 |
| 5,768,533 A | * | 6/1998 | Ran | 395/200.77 |
| 5,918,002 A | * | 6/1999 | Klemets et al. | 395/182.16 |
| 6,064,678 A | * | 5/2000 | Sindhushayana et al. | 370/470 |
| 6,101,168 A | * | 8/2000 | Chen et al. | 370/228 |

* cited by examiner

Primary Examiner—Alpus H. Hsu
(74) Attorney, Agent, or Firm—Mario J. Donato, Jr.; L. Bruce Terry; Jeffrey K. Jacobs (57) ABSTRACT

A method and system for retransmitting data packets in a communication system having variable data rates is disclosed. In a preferred embodiment, data packets are packetized to an atomic packet size equal to that of a lowest rate packet. If a data packet requires retransmission at a rate different than that at which the data packet was initially transmitted, the rate is dynamically changed based upon a multiple of the atomic packet size.

6 Claims, 6 Drawing Sheets

METHOD AND SYSTEM FOR RETRANSMITTING DATA PACKETS IN A COMMUNICATION SYSTEM HAVING VARIABLE DATA RATES

FIELD OF THE INVENTION

The present invention is related in general to communication systems, and, more particularly, to an improved method and system for retransmitting data packets in a communication system having variable data rates.

BACKGROUND OF THE INVENTION

Standards bodies such as the International Standards Organization (ISO) have adopted a layered approach for the reference model of a communication subsystem. The complete communication subsystem is broken down into a number of layers, each of which performs a well-defined function in the context of the overall communication subsystem. It operates according to a defined protocol by exchanging messages,. both user data and additional control information, with a corresponding peer layer in a remote system. Each layer has a well-defined interface between itself and the layer immediately above and below. Consequently, the implementation of a particular protocol layer is independent of all other layers. The function of each layer is specified formally as a protocol that defines the set of rules and conventions used by the layer to communicate with a similar peer layer in another (remote) system. Each layer provides a defined set of services to the layer immediately above. It also uses the services provided by the layer immediately below it to transport the message units associated with the protocol to the remote peer layer.

Communication systems, such as Code Division Multiple Access (CDMA) systems, communicate messages between infrastructure equipment and subscriber or mobile units. As used herein, a forward message refers to a message generated by cellular infrastructure equipment and transmitted for reception by a mobile communication unit, and a reverse message refers to a message generated by a mobile communication unit, such as a mobile cellular phone.

At the most basic level, cdma2000 provides protocols and services that correspond to the bottom two layers of the ISO/OSI Reference Model (i.e., Layer 1—the Physical Layer, and Layer 2—the Link Layer) according to the general structure specified by the ITU for IMT-2000 systems. In cdma2000, a generalized multi-media service model is supported. This allows a combination of voice, packet data, and circuit data services to be operating concurrently (within the limitations of the air interface system capacity). Cdma2000 also includes a Quality of Service (QOS) control mechanism to balance the varying QOS requirements of multiple concurrent services.

One problem associated with the combination of voice, packet data, and circuit data services operating concurrently is the ability to maintain a high data rate connection at a required fixed error rate over a channel of varying quality. In addition, maximizing system capacity when high data rate channels are active presents another problem. Consequently, a need exists for a method and system for retransmitting data packets in a communication system having variable data rates, wherein data rates for high data rate channels are automatically shifted up or down based on a predetermined metric.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1:
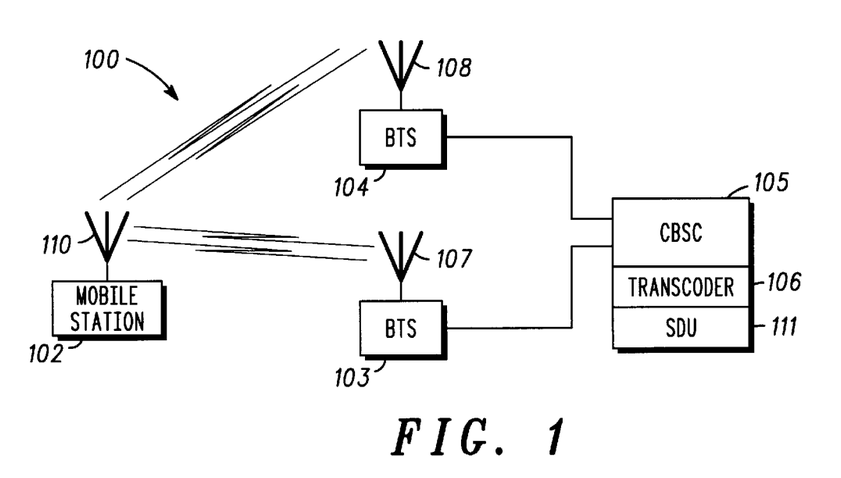
FIG. 1 depicts a communication system in accordance with the method and system of the present invention.

FIG. 1 depicts a communication system 100 in accordance with the preferred embodiment of the present invention. System 100 includes a mobile station 102, a first base transceiver station 104, a second base transceiver station 103, and a Centralized Base Station Controller (CBSC) 105. CBSC 105 includes a transcoder 106, and a selection distribution unit 111. System 100 preferably includes a plurality of mobile stations and base transceiver stations, but only one mobile station and two base transceiver stations are depicted in FIG. 1 for clarity. In a preferred embodiment, system 100 is a Code Division Multiple Access (CDMA) system. System 100 may also be any communication system that transmits signaling messages and requires accurate delivery and receipt by mobile stations.

First base station 104 includes a transceiver 108 that includes a transmitter and a receiver. Second base station 103 includes a transceiver 107 that includes a transmitter and a receiver. Transceivers 107 and 108 transmit, over-the-air, RF signals to be received by mobile unit 102. The transmission is well known in the art, and will not be described further in this application. Signals transmitted from base stations 103 and 104 to mobile unit 102 are referred to herein as forward traffic frames, or as forward link messages. Transceivers 107 and 108 receive messages from mobile unit 102, as is well known in the art. Such messages are referred to herein as reverse link messages.

Mobile unit 102 is preferably a. cellular telephone unit that is capable of communicating with base transceiver stations 103 and 104. In a preferred embodiment, mobile unit 102 is a digital cellular CDMA telephone. Mobile unit 102 may also be a wireless data terminal or a videophone.

Mobile unit 102 includes a transceiver 110 that includes a transmitter and a receiver, as is well known in the art. Mobile unit 102 communicates with base stations 103 and 104 by transmitting messages by the transceiver 110 located therein on a reverse link, and by receiving messages generated by base stations 103 and 104 at transceiver 110 located therein on the forward link.

In the preferred embodiment of the present invention, BTSs 103 and 104 act as the central location for managing power control in system 100. In an alternate embodiment of the present invention, CBSC 105 manages power control in system 100.

Figure 2:
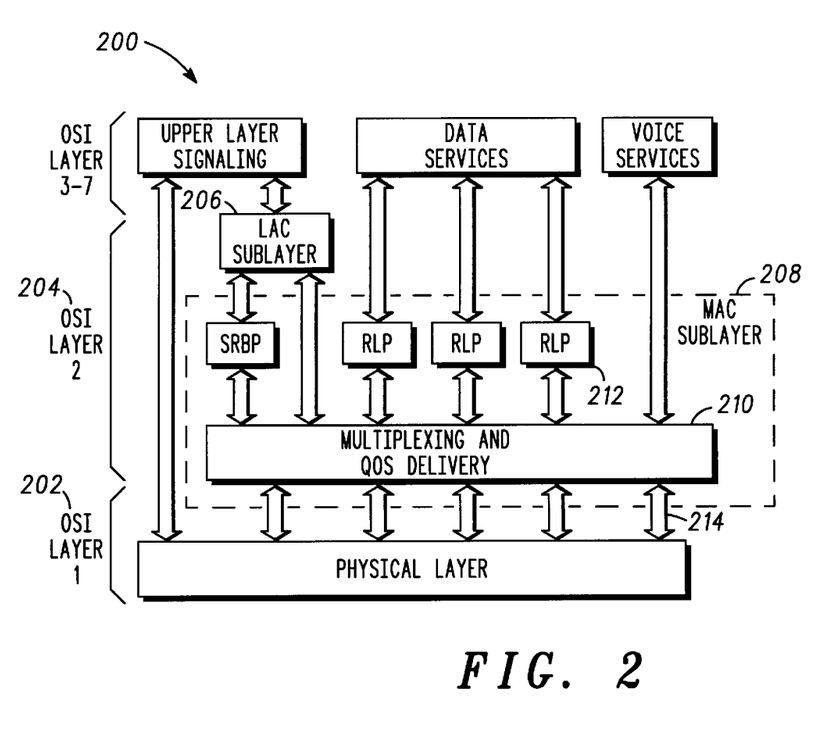
FIG. 2 illustrates a block diagram of a communication system layer structure in accordance with the method and system of the present invention.

FIG. 2 illustrates a block diagram of a communication system layer structure 200 in accordance with the method and system of the present invention. In the preferred embodiment, FIG. 2 illustrates a block diagram of IS-95 and cdma2000 layer structure. However, it will be appreciated by those skilled in the art that other communication systems, such as CDMAOne, UMTS, and ARIB, have similar layer structures. As shown in FIG. 2, IS-95 has a layered structure providing voice, packet data, simple circuit data, and simultaneous voice and packet data services. It should be noted that the term "IS-95" includes any of the standards that are predecessors to cdma2000, i.e. IS-95-A, and TIA/EIA-95-B. At the most basic level, cdma2000 provides protocols and services that correspond to the bottom two layers of the ISO/OSI Reference Model (i.e., Layer 1—the Physical Layer 202, and Layer 2—the Link Layer 204) according to the general structure specified by the ITU for IMT-2000 systems. Layer 2 204 is further subdivided into the Link Access Control (LAC) sublayer 206 and the Medium Access Control (MAC) sublayer 208. In addition, a Quality of service (QOS) control mechanism 210 is included to balance the varying QOS requirements of multiple concurrent services. Applications and upper layer protocols corresponding to OSI Layers 3 through 7 utilize the services provided by the cdma2000 LAC services. Examples include signaling services, voice services, packet data applications, and circuit data applications.

The design of the cdma2000 LAC and MAC sublayers 206, 208 is motivated by many factors, among those being: the need to support a wide range of upper layer services; the requirement to provide for high efficiency and low latency for data services operating over a wide performance range; support for advanced QOS delivery of circuit and packet data services; and the demand for advanced multi-media services that support multiple concurrent voice, packet data, and circuit data services, each with varying QOS requirements. The cdma2000 MAC sublayer 208 provides two important functions: (1) best effort delivery—reasonably reliable transmission over the radio link with a Radio Link Protocol (RLP) 212 that provides a best effort level of reliability; and (2) multiplexing and QOS control—enforcement of negotiated QOS levels by mediating conflicting requests from competing services and by the appropriate prioritization of access requests.

The Packet Data Gateway (PDG) MAC, which in one embodiment is CBSC 105, controls data rate shifting. Either the PDG MAC or the subscriber unit MAC may initiate a rate shift. If the BTS requires a Forward Supplemental Channel (F-SCH) rate switch, the PDG MAC will direct the subscriber unit to shift it's receive rate. If the subscriber unit requires a Reverse Supplemental Channel (R-SCH) rate switch, it will send a request to the PDG MAC, which will then direct the subscriber unit to switch (resources and loading permitting).

In the preferred embodiment, supplemental channel transmit gain is used as a metric for determining whether to shift data rates. The transmit channel gain is a function of power control, thus it provides a reliable and fast metric of channel quality. However, it will be appreciated by those skilled in the art that other channel quality metrics may be used without departing from the spirit and scope of the present invention. When the supplemental channel transmit gain exceeds a rate dependent threshold, the physical layer 202 will indicate the event to the MAC 208, which in turn will initiate a rate shift down via Dedicated Control Channel (DCCH) 214. Likewise, when the gain falls below another rate dependent threshold, a rate shift up can be initiated. In the preferred embodiment, three rates are available for the SCH: 460.8 kbps, 153.6 kbps, and 76.8 kbps. In addition, rate shifts will preferably increment one rate per shift. As will be appreciated by those skilled in the art, rate shifting based on F-SCH transmit power should provide an increase in system capacity or range. If the gain necessary to achieve a required signal-to-noise ratio $E_b/N_0$ exceeds the threshold, shifting to a lower rate will result in transmit power reduction and capacity increase.

Figure 3:
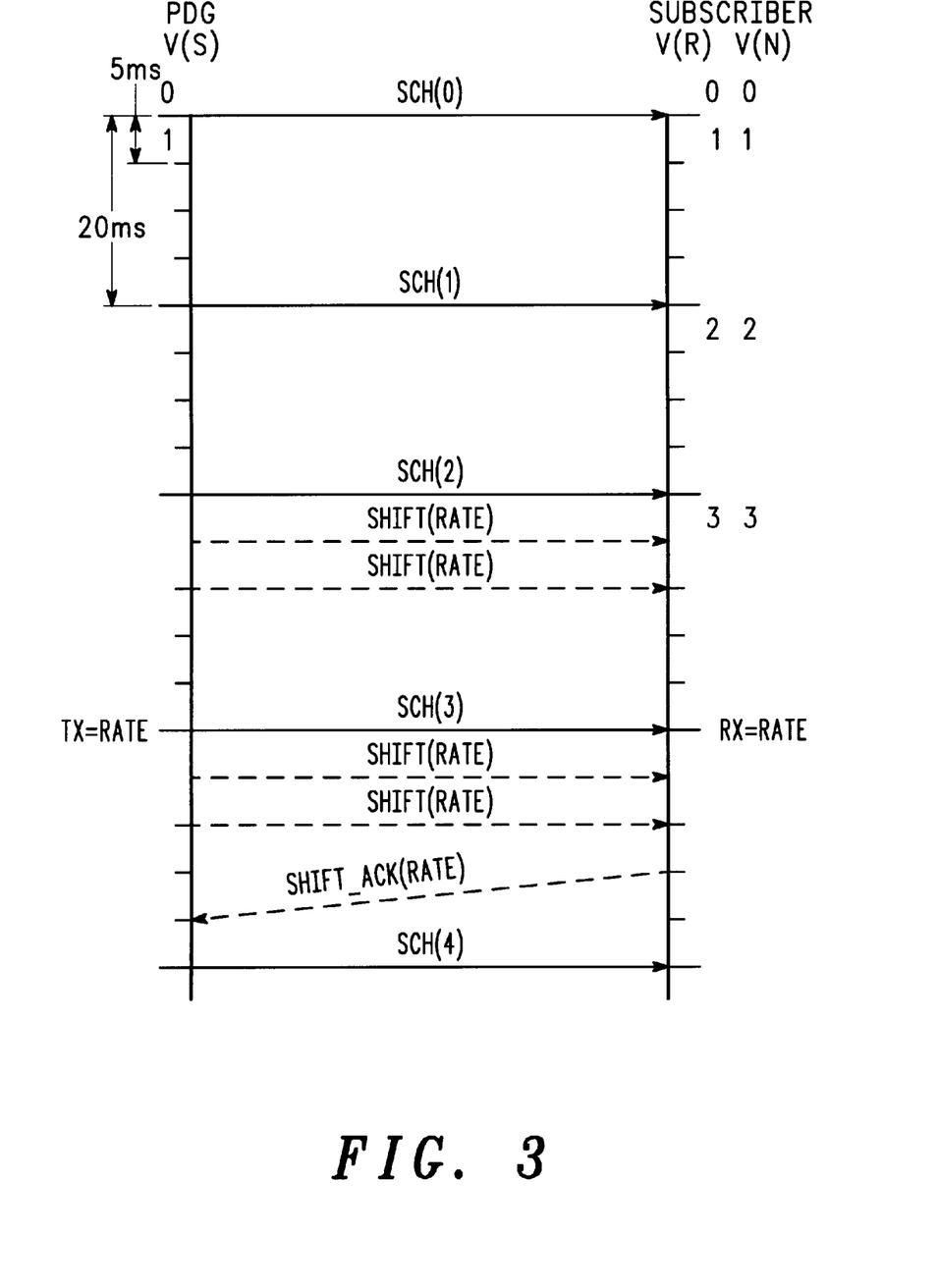
FIG. 3 illustrates a packet data gateway medium access control initiated rate shift transaction in accordance with the method and system of the present invention.

Placing the decision making on the network side of the link, (i.e., PDG MAC) allows for more intelligent rate shifting based on loading, QOS, etc. FIG. 3 illustrates a PDG MAC initiated rate shift transaction in accordance with the method and system of the present invention. To implement a rate shift down on the forward link, if at a given rate R, the BTS detects the SCH gain has exceeded the nominal value for that rate, $G_{nom}$ (R), it will indicate the event to the PDG MAC. If resource availability and loading allow, the PDG MAC will, beginning on the next 20 millisecond frame boundary, send a rate shift SHIFT(RATE) command over the DCCH on the 0 millisecond and 5 millisecond sub-boundary of every 20 millisecond frame until an acknowledgment message SHIFT_ACK(RATE) is received. The MAC layer 208 will also set the F-SCH transmitter to the new rate on the 20 millisecond boundary following the first SHIFT(RATE) frame transmission. RATE is the next lowest rate.

If the SHIFT(RATE) frame arrives without error, the subscriber unit MAC will have approximately 10 to 15 millisecond to set up the F-SCH receiver to the new rate. That is, under ideal conditions, no frames are lost due to the rate shift. Also, by not waiting for a SHIFT_ACK before changing the F-SCH transmit rate, a seamless rate shift can occur if the SHIFT(RATE) frame was received at the subscriber unit but the SHIFT_ACK was lost.

To implement a rate shift up on the forward link, if at a given rate R, the gain falls below a rate dependent threshold, $G_{up}$ (R), the BTS will indicate the event to the PDG. Following the same procedure described above for implementing a rate shift down on the forward link, the PDG MAC directs the subscriber unit to switch to the next higher rate.

Figure 4:
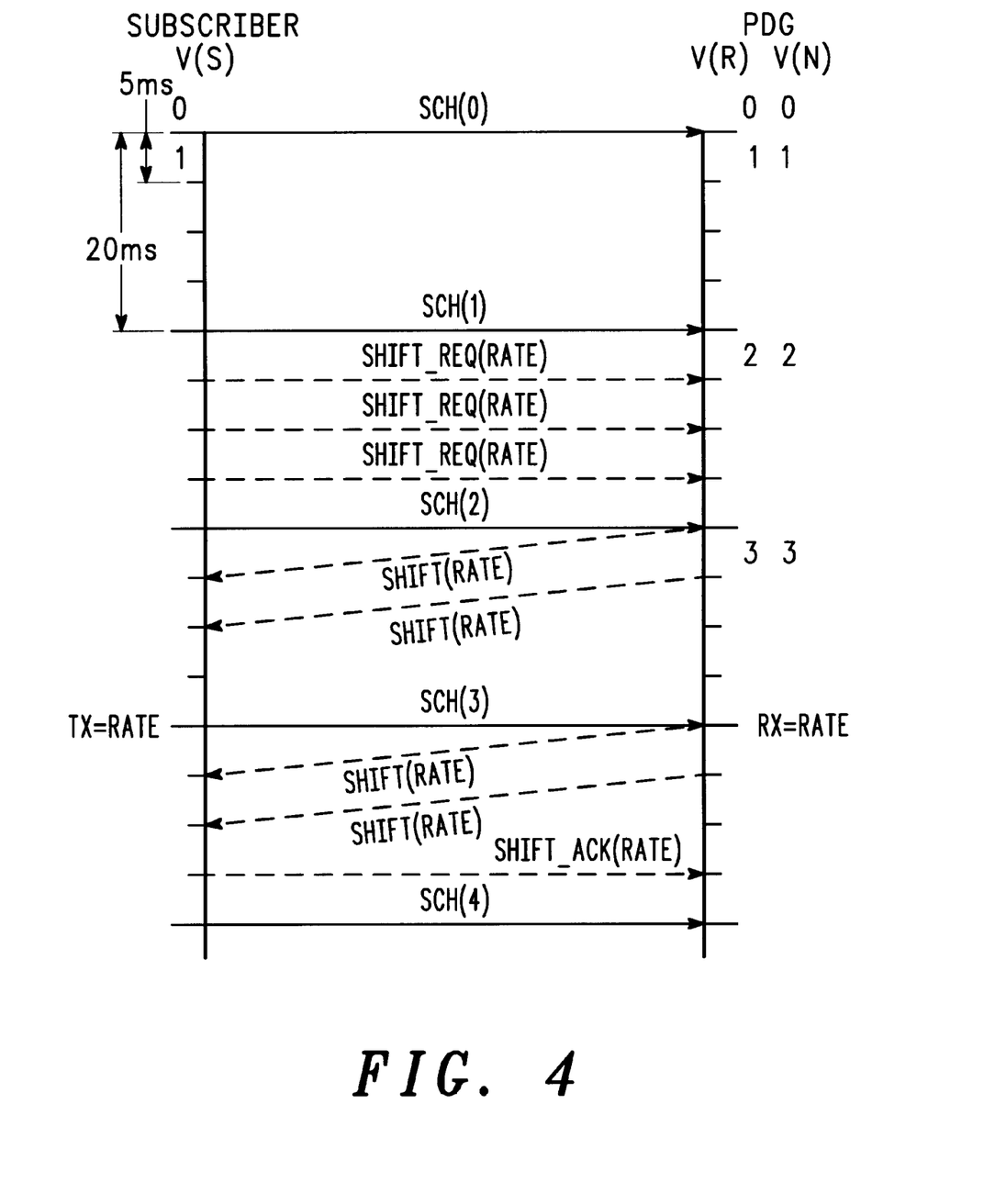
FIG. 4 illustrates a subscriber unit medium access control initiated rate shift transaction in accordance with the method and system of the present invention.

FIG. 4 illustrates a subscriber unit MAC initiated rate shift transaction in accordance with the method and system of the present invention. To implement a subscriber unit initiated rate shift down on the reverse link, if at a given rate R, the subscriber unit physical layer detects that the R-SCH power control derived transmit gain has exceeded the nominal value for that rate, $G_{nom}$ (R), it will indicate the event to the subscriber unit MAC. The subscriber unit MAC thereafter sends a rate shift request, SHIFT_REQ(RATE), to the PDG MAC. The subscriber unit continues to send SHIFT_REQ (RATE) until a response, or rate shift acknowledgment message SHIFT(RATE), is received. If the PDG grants the downshift, it will set RATE equal to the next lowest rate, otherwise it will set RATE equal to the current rate. The PDG will then send the SHIFT(RATE) using the procedure described above for implementing a rate shift down on the forward link.

Alternately, the PDG may initiate a rate shift down on the reverse link. To implement a PDG initiated rate shift down on the reverse link, the PDG directs the subscriber unit to shift down if the R-SCH fixed error rate exceeds a predetermined limit. This allows a rate shift to occur if the subscriber unit does not request a rate shift due to excess gain. In this case, the PDG MAC sends the SHIFT(RATE) using the procedure described above for implementing a rate shift down on the forward link. To implement a rate shift up on the reverse link, if at a given rate R, the R-SCH transmit gain falls below a rate dependent threshold, $G_{up}$ (R), the subscriber unit physical layer indicates the event to the subscriber unit MAC. The subscriber unit MAC will then send a rate shift request, SHIFT_REQ(RATE), to. the PDG MAC. The subscriber unit will continue to send SHIFT_REQ(RATE) until a response, SHIFT(RATE) is received. If the PDG grants the up shift, it will set RATE equal to the next highest rate, otherwise it will set RATE equal to the current rate. The PDG will then send the SHIFT(RATE) using the procedure described above for implementing a rate shift down on the forward link.

When the PDG MAC initiates a rate shift, it assumes that the subscriber unit MAC received the command and switches to the new rate on schedule. If the subscriber unit received the command, but the SHIFT_ACK frame is lost, both sides of the link will still be running at the same rate. The PDG media access channel will continue sending the SHIFT(RATE) command. If the DCCH is reliable, the command will reach the subscriber unit in a short time, in which case the SHIFT_ACK is retransmitted. If the DCCH is unreliable and the SHIFT_ACK never arrived, the media access channel will initiate a call tear down after a time out period. Note that in this case, the SHIFT(RATE) most likely never reached the subscriber unit, meaning the DCCH is not operational and the call should be terminated.

When the PDG MAC initiates a rate switch, it assumes that the subscriber unit MAC received the command and switches to the rate on schedule. If the SHIFT(RATE) frame is lost over the DCCH, the subscriber unit will not switch to the new rate. This will result in frame erasers, as both ends of the link are running different rates. The media access channel will continue to send a SHIFT(RATE) command over the DCCH. If the DCCH is reliable, the subscriber unit will receive the command and switch its F-SCH receiver to the new rate. Packets lost during the rate mismatch will be recovered via retransmitted procedures. If the DCCH link is such that the SHIFT(RATE) is never reached at the subscriber unit, no SHIFT_ACK will be received. After a timeout period, the media access channel will assume the DCCH is lost and initiate a call tear down.

In the preferred embodiment, no subscriber unit initiated rate shift occurs if the SHIFT_REQ(RATE) is not received. Either the SHIFT_REQ(RATE) will eventually be received, resulting in a rate shift, or the DCCH is so unreliable as to cause an eventual call tear down.

The following describes gain thresholds used in the preferred embodiment to determine rate-switching events. However, it will be appreciated by those skilled in the art that other gain thresholds may be used without departing from the spirit and scope of the present invention. The forward link gain thresholds are rate dependent in order to increase system (RF) capacity and maintain a desired QOS. It may also be possible for the PDG to dynamically adjust a threshold to fine tune the system such that maximum RF capacity is approached. On the reverse link, the gain threshold is not rate dependent but is selected so as to avoid power amplifier saturation on the mobile. Also, it may be desirable to lower this threshold, while in a power save mode (i.e., shift to a lower rate to conserve battery life) if the current rate can not be maintained below some lower power threshold.

The gain threshold for a shift down, $G_{down}$, at a given rate R kbps, is based on the nominal required gain at that rate relative to the gain at 9600 bps.

$$G_{down}(R) = G_{nom}(R) = G_{9.6}\sqrt{\frac{R}{9.6}}$$

When the link is at a rate R other than full rate (460.8 kbps), a rate shift up gain threshold, $G_{up}$ (R), exists. If the required transmit gain at a given rate R is G(R), the required gain at the new (higher) rate, $R_{up}$ is:

$$G(R_{up}) = G(R) \times \sqrt{\frac{R_{up}}{R}}$$

The criteria for a rate shift up is that the required gain at the new (higher) rate is less than the nominal gain at that rate by some margin.

$$G_{up}(R) \times \sqrt{\frac{R_{up}}{R}} < G_{nom}(R_{up}) - Delta$$

Where Delta is some margin.

Therefore, the gain threshold, $G_{up}$ (R), to shift from rate R up to Rate $R_{up}$ is:

$$G_{up}(R) = [G_{nom}(R_{up}) - Delta] \times \sqrt{\frac{R}{R_{up}}}$$

Figure 5:
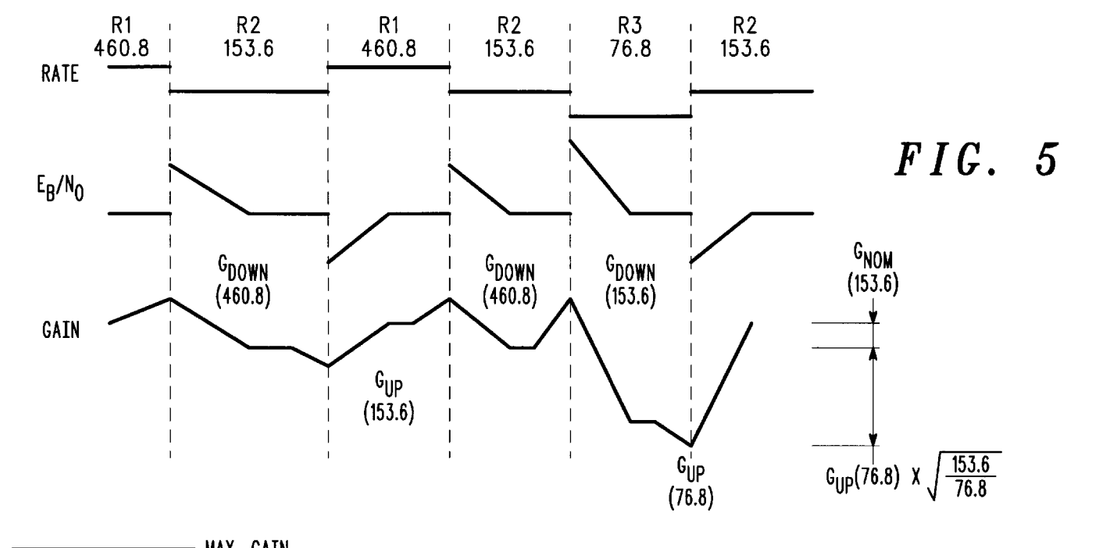
FIG. 5 illustrates an example of rate shifting in accordance with the method and system of the present invention.

FIG. 5 illustrates an example of rate shifting events in accordance with the method and system of the present invention.

Figure 6:
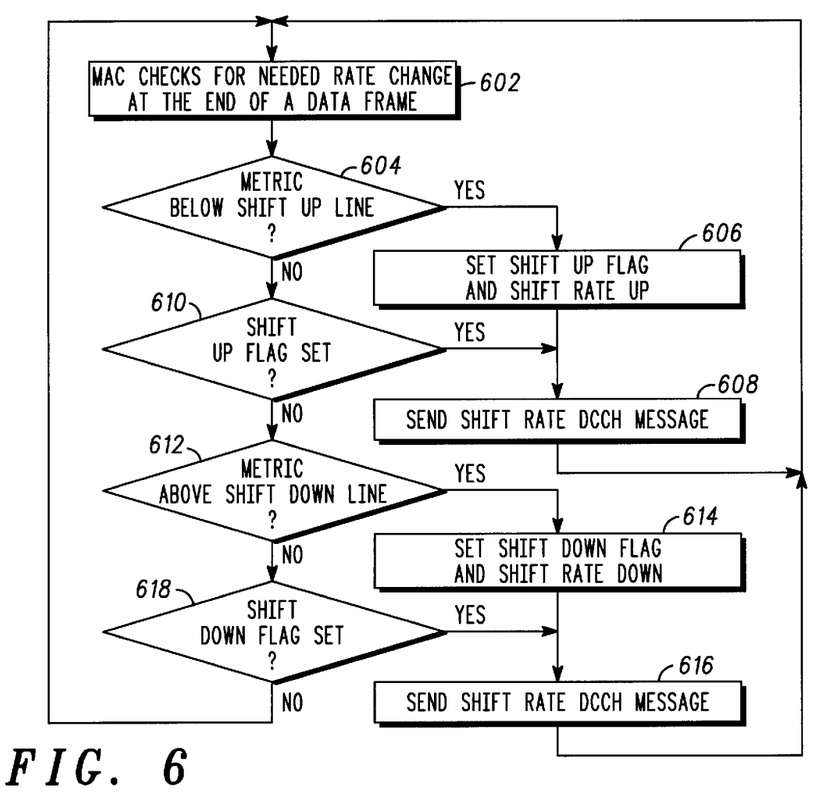
FIG. 6 illustrates a functional flow diagram depicting the process of base transceiver station transmit rate control in accordance with the method and system of the present invention.
Figure 7:
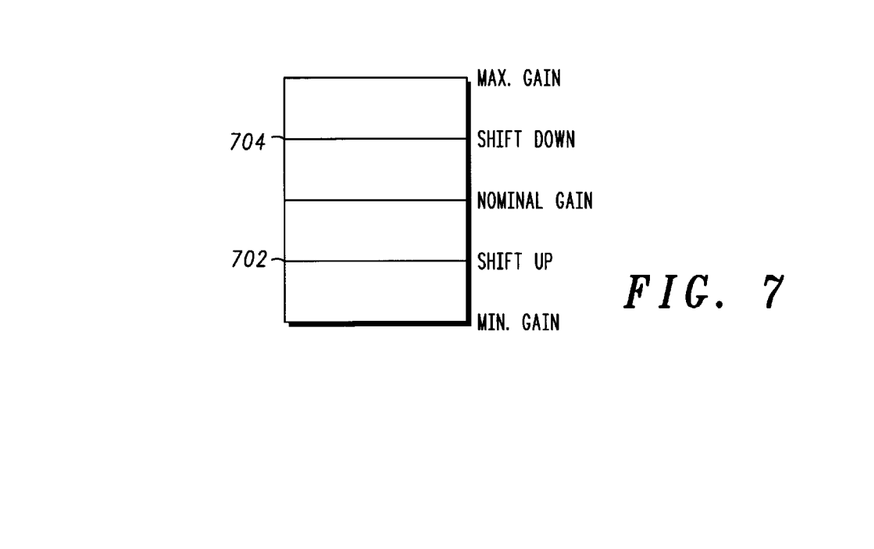
FIG. 7 illustrates a functional flow diagram depicting the process of base transceiver station receive rate control in accordance with the method and system of the present invention.

FIG. 6 illustrates a functional flow diagram depicting the process of base transceiver station transmit rate control in accordance with the method and system of the present invention. As depicted in FIG. 6, at block 602, the medium access channel checks for needed rate change at the end of a data frame. At block 604, a determination is made whether the metric is below the shift up line 702 in FIG. 7. If the metric is below the shift up line 702, then at block 606, the shift up flag is set and the rate is shifted up. Thereafter, at block 608, a shift rate DCCH message is sent, and flow reverts to block 602. If the metric is not below the shift up line 702, then a determination is made at block 610 whether the shift up flag is set. If the shift up flag is set, then flow proceeds to block 608 and continues as described above. If the shift up flag is not set, then a determination is made at block 612 whether the metric is above the shift down line 704 of FIG. 7. If the metric is above the shift down line 704, then at block 614, the shift down flag is set and the rate is shifted down. Thereafter at block 616, a shift rate DCCH message is sent, and flow reverts to block 602. If the metric is not above the shift down line 704, then at block 618, a determination is made whether the shift down flag is set. If the shift down flag is set, then flow proceeds to block 616 as described above. If the shift down flag is not set, then flow reverts to block 602.

Figure 8:
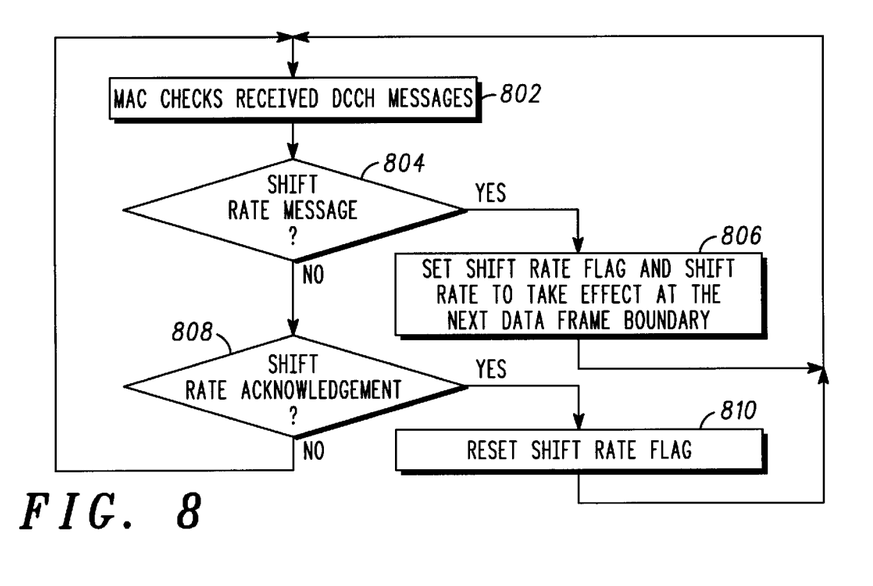
FIG. 8 illustrates a block diagram of the channel gain as determined by power control in accordance with the method and system of the present invention.

FIG. 8 illustrates a functional flow diagram depicting the process of base transceiver station receive rate control in accordance with the method and system of the present invention. As depicted in FIG. 8, at block 802, the medium access control checks received DCCH messages. At block 804, a determination is made whether or not a shift rate message has been received. If a shift rate message is present, then at block 806, the shift rate flag is set and the rate shift is set to take effect at the next data frame boundary. Thereafter, flow reverts back to block 802. If a shift rate message is not present, then at block 808, a determination is made whether a shift rate acknowledgment has been received. If a shift rate acknowledgment has been received, then at block 810, the shift rate flag is reset. If a shift rate acknowledgment has not been received, then flow reverts back to block 802.

Figure 9:
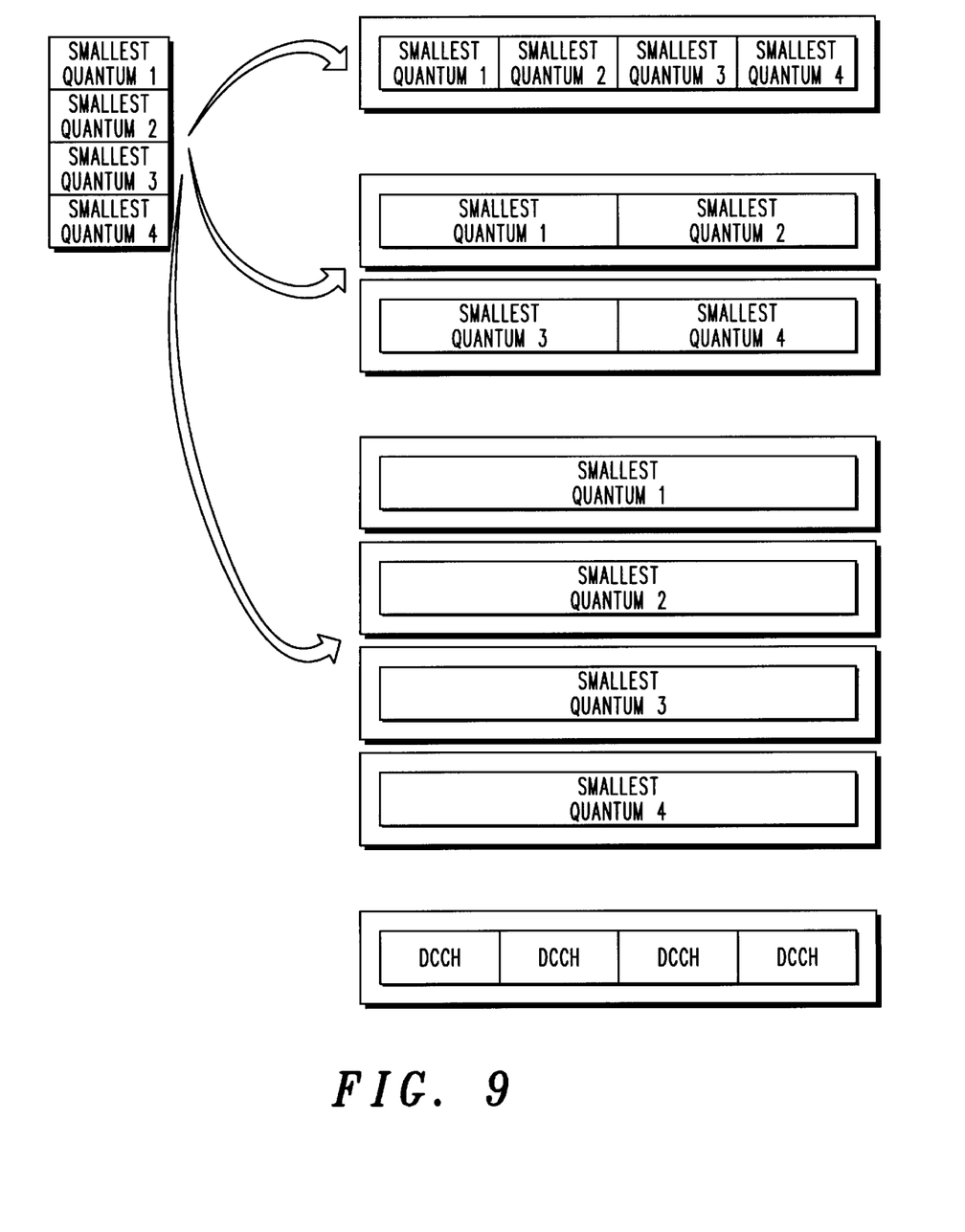
FIG. 9 illustrates data frames being transmitted at different rates.

FIG. 9 illustrates data frames being transmitted at different rates, wherein a full rate 20 millisecond data frame includes four parts (i.e. quantum 1 through quantum 4). A retransmitted half rate includes two 20 millisecond frames, each including two parts (i.e. frame 1—quantum 1 and quantum 2; frame 2—quantum 3 and quantum 4). A retransmitted quarter rate includes four 20 millisecond frames, each including one part (i.e. frame 1—quantum 1; frame 2, quantum 2; etc.). It should be noted that in the preferred embodiment, control channel frame DCCH should be less than or equal to the data frame size.

When a rate shift occurs and there are outstanding NACKed frames that were initially transmitted at the old rate but must be retransmitted at the new rate, the subscriber unit radio link protocol would have to back V(R) (next expected frame) to V(N) (next expected in sequence frame) and inform the PDG radio link protocol to start new rate frames at V(S) equals the subscriber unit's V(R) (i.e., back up to the last frame received in sequence by the subscriber unit). For example, if prior to the rate switch, frames 0, 1, 2, 4 were received by the subscriber unit, and the rate is switched before frame 3 is present, the receiver sets V(R)=V(N)=3 and includes V(R) in the SHIFT_ACK packet. The PDG radio link protocol then starts transmitting at the new rate from packet 3. If this is not done, packet sequence order is not preserved.

The rate-switching algorithm assumes an atomic packet size equal to that of the lowest rate packet. The SCH rates available are 460.8, 153.6, and 76.8 kbps. Therefore, the atomic packet size P should be that of 76.8 kbps. Then at 153.6 kbps, 2P packets are sent in a 20 millisecond frame while at 460.8 kbps, 6P packets are sent. Using this scheme, rate switches should be transparent to the radio link protocol.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for retransmitting data packets in a communication system having variable data rates, the method comprising the steps of:

packetizing data to an atomic packet size equal to that of a lowest rate packet;

determining whether a data packet requires retransmission at a rate different than that at which the data packet was initially transmitted; and dynamically changing the retransmission rate based upon a multiple of the atomic packet size, wherein the step of dynamically changing includes the steps of:

determining a last frame received in sequence by a subscriber unit; and transmitting at a new rate from a frame equal to a next expected in sequence frame.

2. The method for retransmitting data packets according to claim 1, wherein the step of determining a last frame received includes the step of setting a next expected frame equal to the next expected in sequence frame.

3. The method for retransmitting data packets according to claim 2, including the step of starting new rate frames at the last frame received in sequence by the subscriber unit.

4. A system for retransmitting data packets in a communication system having variable data rates, the system comprising:

means for packetizing data to an atomic packet size equal to that of a lowest rate packet;

means for determining whether a data packet requires retransmission at a rate different than that at which the data packet was initially transmitted; and means for dynamically changing the retransmission rate as a function of a multiple of the atomic packet size, wherein the means for dynamically changing includes means for determining a last frame received in sequence by a subscriber unit; and means for transmitting at a new rate from a frame equal to a next expected in sequence frame.

5. The system for retransmitting data packets according to claim 4, wherein the means for determining a last frame received includes means for setting a next expected frame equal to the next expected in sequence frame.

6. The system for retransmitting data packets according to claim 5, including means for starting new rate frames at the last frame received in sequence by the subscriber unit.

* * * * *